United States Patent
Holma et al.

(10) Patent No.: US 6,836,471 B2
(45) Date of Patent: Dec. 28, 2004

(54) METHOD AND SYSTEM FOR INTER-OPERATOR HANDOVER BETWEEN WCDMA AND GSM

(75) Inventors: Harri Holma, Helsinki (FI); Karl Tigerstedt, Esbo (FI); Atte Artamo, Espoo (FI); Kai Heikkinen, Helsinki (FI); Uwe Schwarz, Veikkola (FI); Achim Wacker, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 561 days.

(21) Appl. No.: 09/776,234

(22) Filed: Feb. 2, 2001

(65) Prior Publication Data

US 2002/0105927 A1 Aug. 8, 2002

(51) Int. Cl.[7] .......................... H04Q 7/00; H04Q 7/30; H04Q 7/216
(52) U.S. Cl. ................... 370/331; 370/336; 370/338; 370/342; 370/345; 455/443
(58) Field of Search ................ 370/328, 331, 370/332, 335, 336–338, 342, 345, 443, 349; 455/443, 436, 437, 438, 442

(56) References Cited

U.S. PATENT DOCUMENTS

| | | | |
|---|---|---|---|
| 5,920,818 A | 7/1999 | Frodigh et al. | 455/443 |
| 6,320,873 B1 * | 11/2001 | Nevo et al. | 370/466 |
| 6,337,983 B1 * | 1/2002 | Bonta et al. | 455/437 |
| 6,438,117 B1 * | 8/2002 | Grilli et al. | 370/331 |
| 6,567,670 B1 * | 5/2003 | Petersson | 455/522 |
| 6,594,242 B1 * | 7/2003 | Kransmo | 370/331 |
| 6,597,679 B1 * | 7/2003 | Willars | 370/342 |
| 2002/0102980 A1 * | 8/2002 | Jokinen | 455/450 |
| 2002/0147008 A1 * | 10/2002 | Kallio | 455/426 |

FOREIGN PATENT DOCUMENTS

EP   0382309   8/1990   ............ H04B/7/26

OTHER PUBLICATIONS

3G TS 25.101 V3.1.0 (Dec. 1999) 3rd Generation Partnership Project (3GPP); Technical Specification Group (TSG) RAN WG4, UE Radio Transmission and Reception (FDD).
3G TS 22.129 3.2.0 (Dec. 1999) 3rd Generation Partnership Project (3GPP); Technical Specification Group Services and System Aspects Service aspects; Handover Requirements between UMTS and GSM or other Radio Systems (latest version).

* cited by examiner

*Primary Examiner*—John Pezzlo
*Assistant Examiner*—Ahmed Elallam
(74) *Attorney, Agent, or Firm*—Ware, Fressola, Van Der Sluys & Adolphson LLC

(57) ABSTRACT

A method and system for inter-operator handover in a telecommunications network comprising a greenfield WCDMA operator and a GSM/WCDMA operator. When a mobile terminal of the greenfield operator is moving from the coverage area of the home network to the GSM/WCDMA area, a neighbor list of GSM cells is provided to the mobile terminal for handover to a GSM cell when the home network coverage is not available. When the mobile terminal is returning home from the GSM/WCDMA area, a neighbor list of the home cells is provided to the mobile terminal so that the greenfield mobile station is connected to its home network whenever there is coverage. Preferably, the neighbor lists are provided to the mobile terminal only in the connected mode.

18 Claims, 4 Drawing Sheets

METHOD AND SYSTEM FOR INTER-OPERATOR HANDOVER BETWEEN WCDMA AND GSM

FIELD OF THE INVENTION

The present invention generally relates to a mobile telecommunications network and, in particular, to a handover event between a WCDMA coverage area and a GSM coverage area.

BACKGROUND OF THE INVENTION

In a mobile phone network, the covering area of an operator is divided into cells, or radio coverage areas. A cell corresponds to the covering area of one transmitter or a small collection of transmitters. When the user of a mobile terminal moves between cells associated with different base station sites, an ongoing call must be switched to a different radio coverage channel or cell. This is known as handover, or handoff. In particular, when the handover takes place between a cell of one network and a cell of another network, the event is known as inter-system handover or inter-operator handover.

The starting point of the third-generation (3G) mobile system, Universal Mobile Telecommunication System (UMTS) is the new radio interface generally known as Universal Terrestrial Radio Access Network (UTRAN), and the GSM/GPRS base cored network, where GSM/GPRS, which stands for a General Packet Radio System for the Global System for Mobile Communications, is the network for the so-called second generation mobile system using digital transmission. UTRAN is a conceptual term identifying a part of a radio communication network, wherein a plurality of mobile terminals communicate with each other through one or more base stations. In particular, UTRAN identifies part of the network, which consists of radio network controllers (RNCs) and Node Bs between an interconnection point (Iu) and the radio interface (Uu). The interconnection point In is located between an RNC and the core network, and the radio interface Uu is located between UTRAN and the user equipment (UE). One of the modes of UTRAN for the user equipment (UE) is the FDD (Frequency-Division Duplex) mode, as distinguished from the time-division duplex (TDD) mode. UE radio transmission and reception (FDD) is described in the Technical Specification (TS) 25.101 v 3.1.0 (1999-12) of the Third Generation Partnership Project (3GPP) and documents referenced therein. UTRAN can operate in two different modes: Wideband Code Division Multiple Access (WCDM) mode and Time Division/Code Division Multiple Access (TD/CDMA) mode. The handover requirements between UMTS and GSM or other radio systems are specified in 3G TS 22.129 3.0.0 (1999–04).

In the course of moving from the second-generation to the third-generation mobile telecommunications system, some network operators build a third-generation network upon an earlier GSM network, extending the GSM coverage areas to include the WCDMA radio coverage in the initial phase of system development. Typically these operators make use of existing base station sites to speed up WCDMA deployment and to share sites and transmission costs with the existing second-generation system. Other WCDMA network operators, known as greenfield operators, do not have any earlier network. With the first type of network operators (WCDMA/GSM operators), handovers within the same system but different radio technologies can be performed in accordance with the requirements set forth in 3G TS 22.129 3.0.0 (1999–04). Handovers between different operators can be performed using the known art of GSM-GSM handover requirements. As such, roaming makes it possible for a GSM mobile terminal to make and receive calls using any other GSM network.

Handovers for a mobile terminal of a greenfield WCDMA operator are more complex. In this development phase, greenfield WCDMA operators are not likely to build continuous countrywide coverage within a short time. This means that the mobile terminals of a greenfield WCDMA operator must rely on the radio coverage of the first type operators.

A mobile terminal can be operated in an idle mode or a connected mode. Currently, when the mobile terminal of a greenfield WCDMA operator runs out of his 3G coverage area in the connected mode and there is no handover, the call will be dropped. If there is a roaming agreement between a greenfield operator and a WCDMA/GSM operator, the mobile terminal will make a cell reselection to the GSM network and start a new connection after the call drops. If there is no such roaming agreement, the mobile terminal of the greenfield network cannot make any connections outside the coverage area of the home network. When the mobile terminal of the greenfield operator is located outside the home network, it can find the home network only in the idle mode. Typically, a mobile terminal in the idle mode selects a Public Land Mobile Network (PLMN) to contact. The mobile terminal looks for a suitable coverage area of the chosen PLMN and chooses that coverage area to provide available services in a process called camping. With the camping process, the mobile terminal may be connected to another operator's network, instead of it own network, even if there would be coverage from its home network.

Alternatively, a large neighbor list is provided to all mobile terminals of the greenfield operators. Such a list contains cells that are accessible and cells that are inaccessible to a certain mobile terminal. Based on a such list, a core network will decide whether a handover can take place based on the list. Because a large number of cells are included in the intersystem measurements, unnecessary handover signaling is resulted. Handover measurements involving a large number of cells also take more time. Furthermore, handover measurements in WCDMA use a compressed mode, which may cause more interference.

It is advantageous and desirable to provide a method and system for inter-system handovers, wherein unnecessary handover signaling is eliminated and the mobile terminal of a greenfield operator is always connected to its own network, if possible.

SUMMARY OF THE INVENTION

According to the first aspect of the invention, a method of inter-operator handover in a telecommunications network comprising a first operator of a first sub-network operated in a wideband code division multiplex access (WCDMA) mode having a plurality of first radio coverage areas; and a second operator of both a second sub-network and a third sub-network, wherein the second sub-network is operated in a radio frequency accordance with the Global System for Mobile Communications (GSM) mode having a plurality of second radio coverage areas partly overlapping with the first radio coverage areas, and the third sub-network is operated in the WCDMA mode having a plurality of third radio coverage areas, and wherein the handover is performed for a mobile terminal of the first operator between the first and the second operators when the mobile terminal is located in an overlapped section of the first coverage areas and the second coverage areas, said method comprising the steps of:

proviuding a first list of first radio coverage areas visible to the mobile terminal for allowing the mobile terminal to access the first radio coverage areas through the first sub-network when the mobile terminal moves into the first coverage areas; and providing a second list of second radio coverage areas to the mobile terminal for allowing the mobile terminal to access the second coverage areas through the second sub-network when the mobile terminal is located in the second coverage areas beyond the first coverage areas.

Preferably, the second list is provided when the mobile terminal is operated in a connected mode.

Preferably, the first list is provided by a radio network controller of the first sub-network or a base station controller of the second sub-network.

Preferably, the second list is provided by a radio network controller of the first sub-network or a base station controller of the second sub-network.

Preferably, the first list is specific to the mobile terminal of the first operator such that the first list is inaccessible to other mobile terminals of the first operator.

Preferably, the first list is specific to the mobile terminal of the first operator such that the first list is inaccessible to the mobile terminals of the second operator.

According to the second aspect of the invention, a method of inter-operator handover in a telecommunications network comprising a first operator of a first sub-network operated in a wideband code division multiplex access (WCDMA) mode having a plurality of first radio coverage areas, and a second operator of both a second sub-network and a third sub-network, wherein the second sub-network is operated in a radio frequency accordance with the Global System for Mobile Communications (GSM) mode having a plurality of second radio coverage areas partly overlapping with the first radio coverage areas, and the third sub-network is operated in the WCDMA mode having a plurality of third radio coverage areas, and wherein the handover is performed for a mobile terminal of the first operator between the first and the second operators when the mobile terminal is located in an overlapped section of the first coverage areas and the second coverage areas, said system comprising:

a first means for providing a first list of first radio coverage areas visible to the mobile terminal for allowing the mobile terminal to access the first radio coverage areas through the first sub-network when the mobile terminal moves into the first coverage areas; and a second means for providing a second list of second radio coverage areas to the mobile terminal for allowing the mobile terminal to access the second coverage areas through the second sub-network when the mobile terminal is located in the second coverage areas beyond the first coverage areas.

Preferably, the first means is located in a radio network controller of the first operator.

Preferably, the first means is located in a base station controller of the second operator.

Preferably, the second means is located in a radio network controller of the first operator.

The present invention will become apparent upon reading the description taken in conjunction of FIGS. 1 to 4.

DETAILED DESCRIPTION

In mobile telecommunications, handover is a functionality to maintain continuity of service to a mobile terminal as it moves between radio coverage areas or cells, associated with different base stations of the same or different operators. Handover can also occur due to change of radio resource providing a service without necessarily any change of base stations involved.

In a GSM system, the mobile terminal is the active participant in the handover procedure. The mobile terminal continuously controls its own signal strength and the signal strength of the neighboring cells. The signal strength of the neighboring cells can be obtained from received signal strength indicator (RSSI) measurements of all cells in the neighbor list, which is provided by the base station. The signal strength measurements allow the base station controller (BSC) to decide which is the best cell in order to maintain the quality of the communication link. Two basic algorithms are used for the handover.

With the "minimum acceptable performance" algorithm, the power level of the mobile terminal is increased as the quality of the transmission decreases. A handover is performed when the power increase no longer has effect on the quality of the signal.

With the "power budget" algorithm, the handover is performed when the quality of the signal has deteriorated to a certain degree, without continuously increasing the power level.

When handover is performed from a UTRAN system to a non-UTRAN system, such as GSM, the procedure starts at the UE receiving the GSM neighbor cell parameters on System Information messages provided on a downlink broadcast channel (BCCH), or Measurement Control message provided on a downlink dedicated control channel (DCCH). Based on the measurement report from the UE, RNC makes a handover decision. Similarly, when handover is performed from a non-UTRAN system to UTRAN, the procedure starts at the dual-mode UE receiving the UTRAN neighbor cell parameters on GSM System Information messages. After receiving the measurement report, the GSM BSC makes a handover decision.

Figure 1:
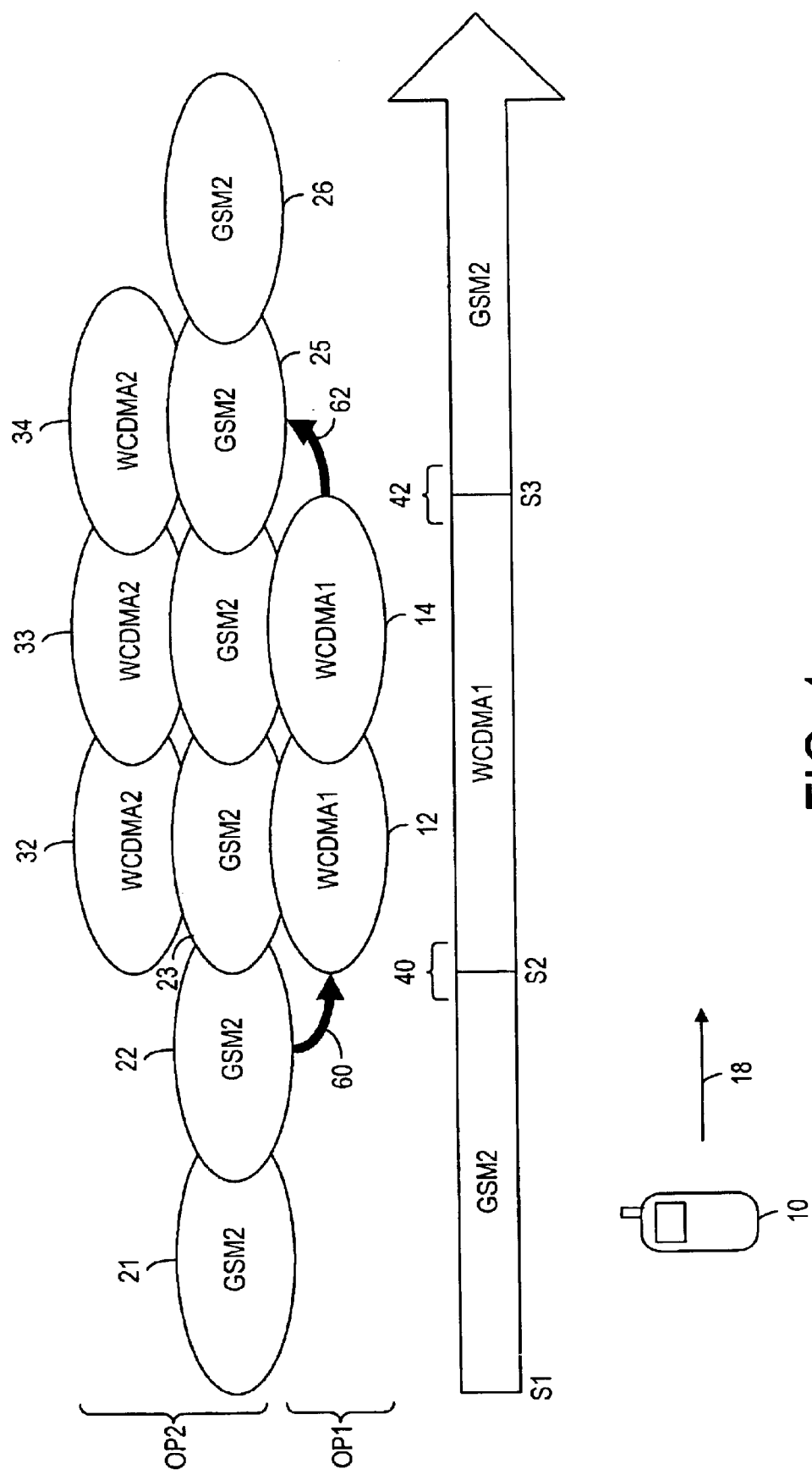
FIG. 1 is a schematic diagram showing the radio coverage areas of Operator 1 and Operator 2.

As mentioned hereinabove, greenfield operators cannot build continuous countrywide coverage in a short time. These operators have to rely on existing operators' networks to maintain continuity of service to a mobile terminal as the mobile terminal moves between the radio coverage areas or cells, associated with different operators' networks. As shown in FIG. 1, a greenfield operator (OP1) provides a WCDMA sub-network including cells 12 and 14 between the areas marked S2 and S3. Another operator (OP2) provides both a WCDMA sub-network including cells 32–34, and a GSM sub-network including cells 21–26. If a mobile terminal 10 of OP1 network is moving through different areas along a direction 18, it is under the radio coverage of OP1 and OP2. When the mobile terminal 10 is located in an area between S1 and S2, the only available radio coverage to the mobile terminal 10 is from the OP2 network. If the mobile terminal 10 is in the idle mode, only the OP1 cells are listed in the system information message. The mobile terminal automatically tries to find the OP1 cells when it is camping to an OP2 cell. If the mobile terminal 10 is in the active, or connected, mode and it is not already connected to the GSM sub-network of OP2, it is provided with a neighbor list including a plurality of GSM cells. When the mobile terminal 10 moves toward S1 and is in an area 40 where the radio coverage of OP1 and the radio coverage of OP2 overlap, the mobile terminal 10 is provided with a neighbor list including a plurality of OP1 cells so as to allow the mobile terminal 10 to be handed over from OP2 in GSM mode to OP1, as denoted by arrow 60. This is to ensure that, when the mobile terminal 10 is in its home area (between S2 and S3), it is always connected to its home network. The neighbor list, including a plurality of OP1 cells, is herein referred to as the first list (see step 120 in FIG. 4). The neighbor list, including a plurality of OP2 cells, is herein referred to as the second list (see step 116 in FIG. 3). When the mobile terminal 10 moves toward S3 and is in an area 42 where the radio coverage of OP1 and the radio coverage of OP2 overlap again, the mobile terminal 10 is provided with another neighbor list including a plurality of OP2 cells so that the handover is performed from the WCDMA sub-network of OP1 to the GSM sub-network of OP2. It is understood that the GSM cells in the second list provided at area 42 are probably different from the second list provided at area 40. For example, the second list provided at area 42 may include GSM cells 25 and 26, and the second list provided at area 40 may include GSM cells 21 and 22. Such second lists help to prevent the roaming mobile terminal of OP1 from accessing the WCDMA cells 32–34 of OP2. As it is known in the idle mode, the mobile terminal, or UB, is identified by non-access stratum identities such as IMSI (International Mobile Subscriber Identity), TMSI (Temporary Mobile Subscriber Identity) and P-TMSI. (Packet TMSI). As the BSC/RNC knows the IMSI of the mobile terminals, the BSC/RNC knows the home network of the mobile terminals. Thus, the BSC/RNC can correspondingly provide correct neighbor lists for the mobile terminals.

Figure 2:
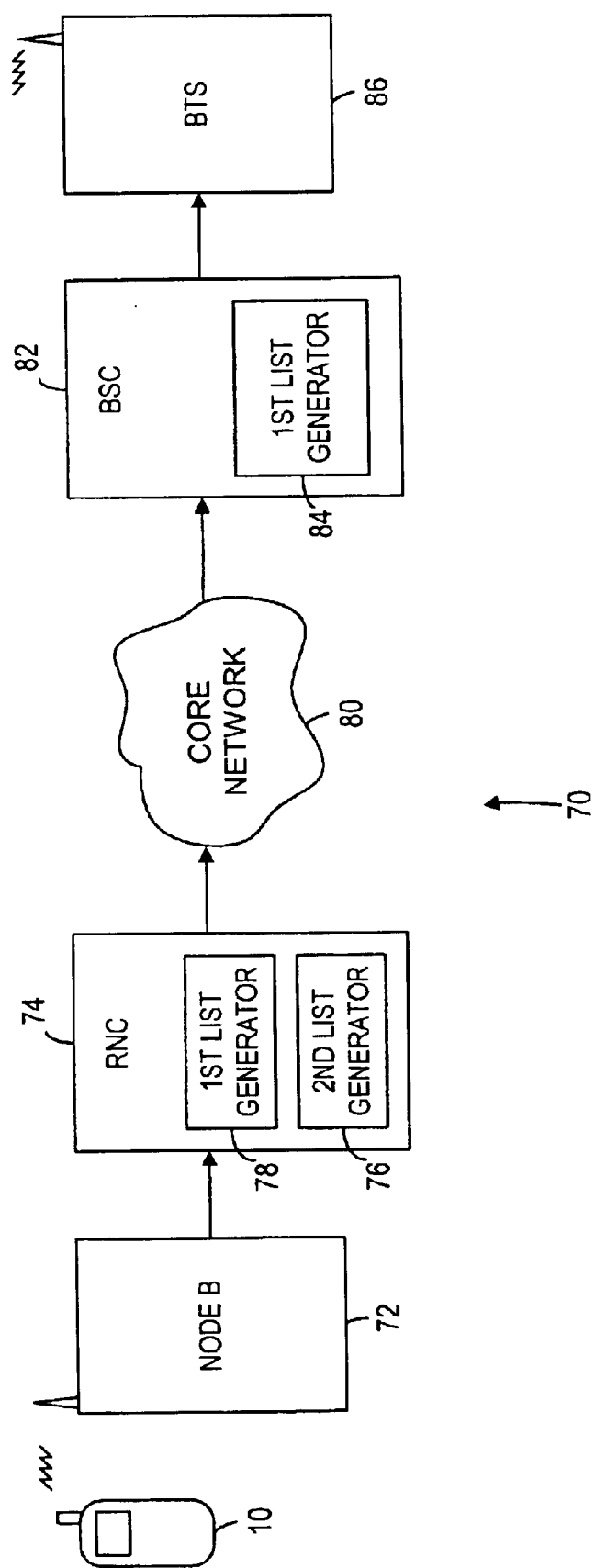
FIG. 2 is a diagrammatic representation of a mobile telecommunications system, according to the present invention.

The system for inter-operator handover between a greenfield WCDMA network and a GSM network is shown in FIG. 2. As shown, the telecommunications network 70 includes a core network 80, which is linked to a radio network controller (RNC) 74 on the WCDMA side and a base-station controller (BSC) 82 on the GSM side. The RNC 74 has a mechanism 76 for generating a neighbor list (second list) allowing the mobile terminal 10 to perform a handover event 62 from WCDMA (OP1) to GSM (OP2) (see FIG. 1), and a mechanism 78 for generating a neighbor list (first list) for soft handovers within the home network of OP1. The BSC 82 has a mechanism 84 for generating a neighbor list (first list), allowing the mobile terminal 10 to perform a handover event 60 from GSM to WCDMA (OP1). The RNC 74 is connected to a Node-B 72 and the BSC 82 is connected to a base transceiver station (BTS) 86.

Figure 3:
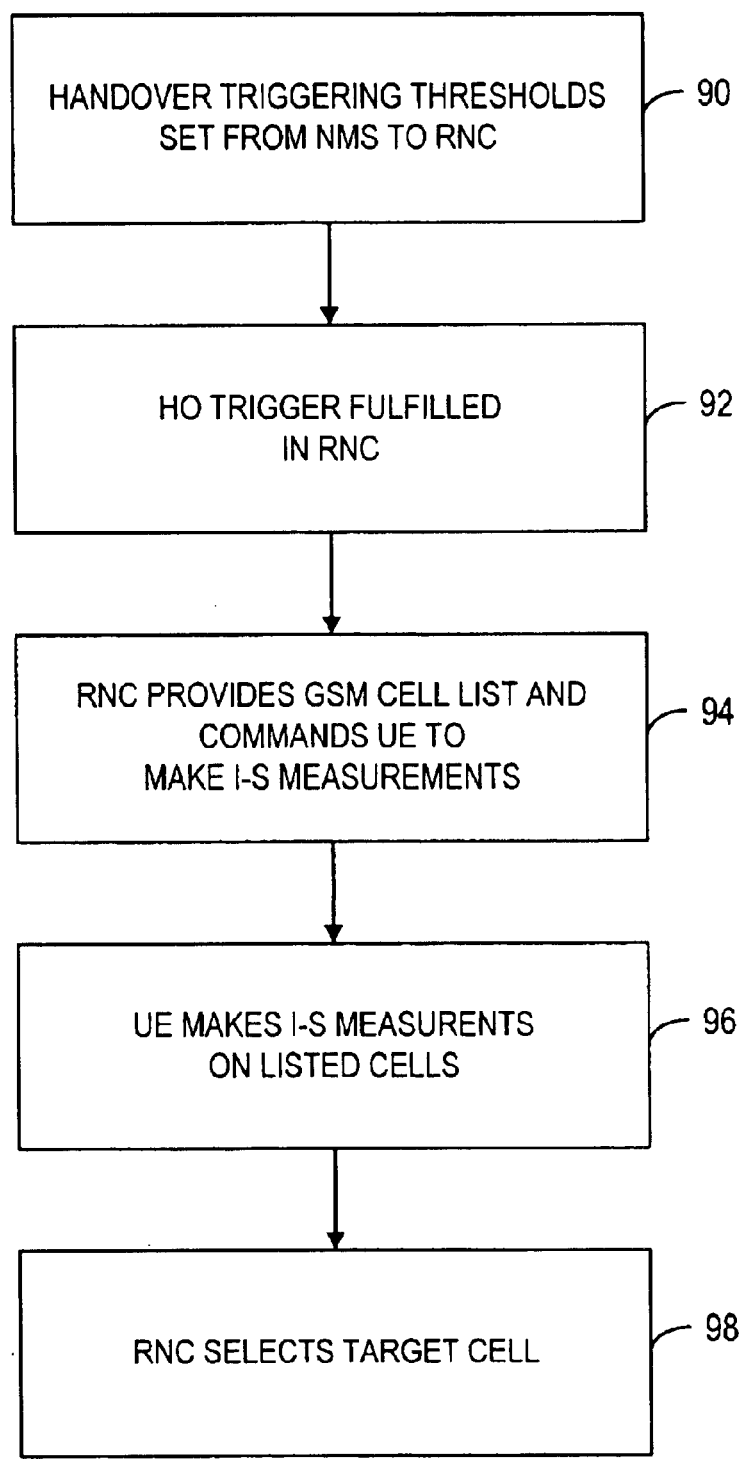
FIG. 3 is a flow chart illustrating the process for handover from Operator 1 to Operator 2.

The handover from a greenfield WCDMA network to the GSM sub-network of OP2 is illustrated in FIG. 3. As shown in FIG. 3, when the mobile terminal 10 (see FIG. 1) is located in an overlapping area such as area 42 (FIG. 1), handover triggering thresholds are set from the Network Management System (NMS, not shown) to the RNC 74, as shown in at Step 90. If the handover trigger is fulfilled in the RNC 74, as shown at step 92, the RNC 74 commands the mobile terminal 10 to make Inter-System measurements and informs the mobile terminal 10 about the neighbor list (second list, including a plurality of OP2 GSM cells for allowing the mobile terminal 10 to access thereto, for example) at Step 94. The mobile terminal 10 makes measurements, at Step 96, on the allowed cells as provided in the neighbor list. Finally, the RNC 74 selects a target cell based on the measurements, service priority and load, at Step 98.

Figure 4:
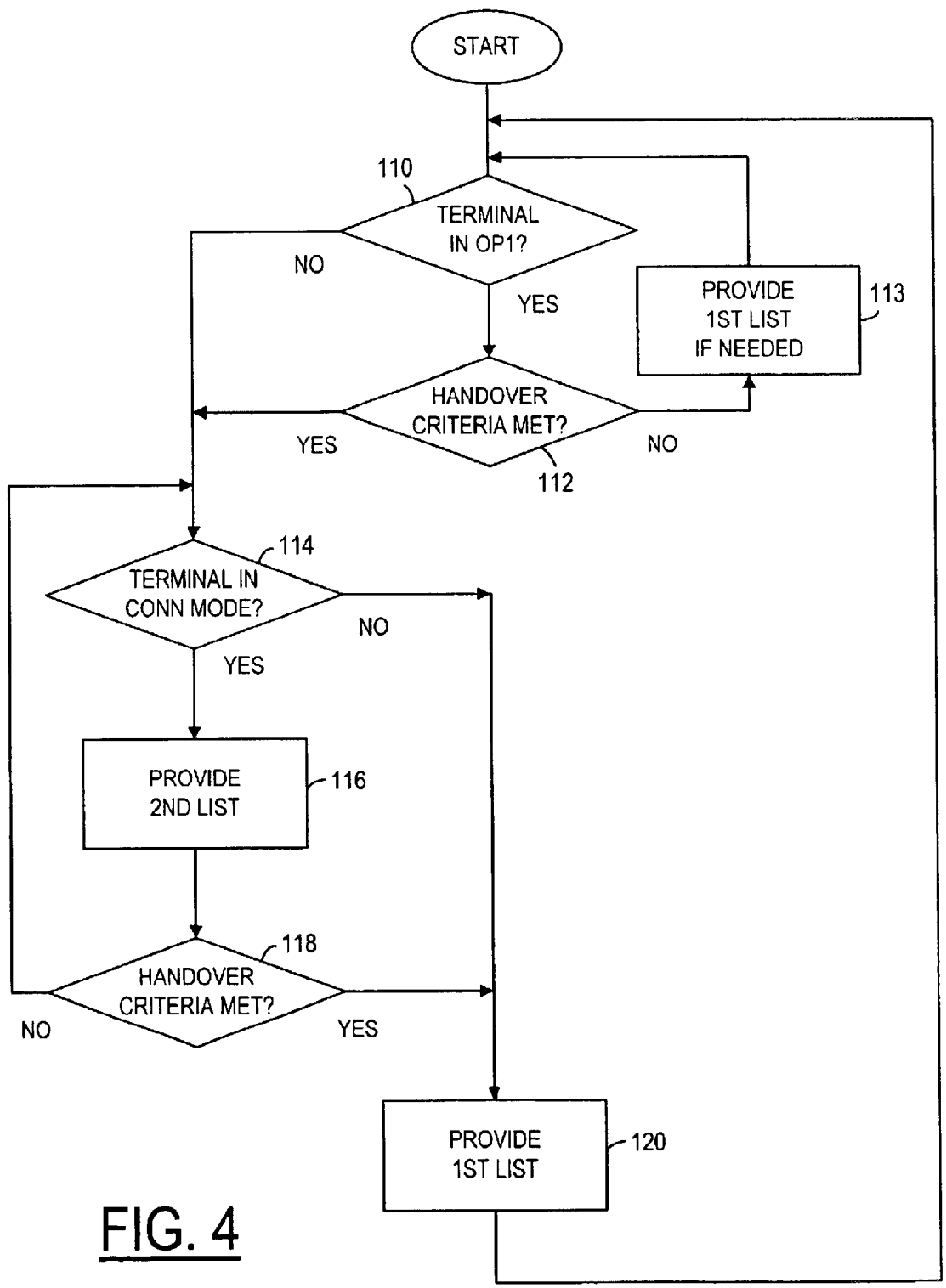
FIG. 4 is a flow chart illustrating the steps for providing neighbor lists to a mobile terminal, according to the present invention.

FIG. 4 illustrates how neighbor lists are provided to a mobile terminal of a greenfield operator (OP1). At Step 110, the whereabouts of the OP1 mobile terminal are determined. If it is in its home network, then the neighbor list of home cells (first list) is provided for Intra-System or soft handover if necessary, as shown at Step 113. Otherwise, no action is needed. If the mobile terminal is in its home network but is near the border of OP2 network, and it is determined, at Step 112, that the criteria for handover to OP2 are met, the process continues at Step 114. Likewise, if the mobile terminal is already in the OP2 area, the process continues at Step 114. At Step 114, it is determined whether the mobile terminal 10 is operated in the idle mode or connected mode. If the mobile terminal 10 is in the idle mode and camping to an OP2 cell, it can automatically find its home cells based on the list of OP1 cells in the system information message. If the mobile terminal is operated in the connected mode, a neighbor list including GSM cells of OP2 is provided, at Step 116, to the mobile terminal so it can be connected to the GSM sub-network, if necessary, to maintain the continuity of an existing call. But when the mobile terminal 10 moves toward its home network and the criteria for handover to OP1 are met, as shown at Step 118, a neighbor list, including OP1 cells, is provided to the mobile terminal 10, at Step 120, so that handover from the OP2 GSM sub-network to the OPI WCDMA network can be performed.

In summary, according to the method, as described hereinabove, the greenfield 3G mobile terminals are connected to their home network whenever there is radio coverage from the home network and to a GSM network only when there is no radio coverage from the home network. When the mobile terminal of the greenfield 3G operator is moving between the area of its home network's coverage and the area with no home network's coverage, handovers to a GSM network are performed so that the connection is not dropped. When a greenfield mobile terminal is returning to the coverage area of its home network from a GSM sub-network of another operator, the GSM sub-network should be able to push the roaming mobile terminal back to its home network. It is required that the neighbor list of the greenfield 3G cells in the BSC depend on the mobile terminal, so that the greenfield 3G cells in the neighbor list are visible only to the mobile terminal of the same greenfield operator, and not to the mobile terminal of other operators. Preferably, the neighbor list is specific to the mobile terminal of the greenfield operator such that the list is not visible even to other mobile terminals of the same greenfield operator. When the greenfield mobile terminal is leaving the coverage area of its home network, the greenfield 3G network should be able to handover the greenfield mobile terminal to the GSM operator's network. With the neighbor list including greenfield cells to the roaming greenfield mobile terminal, the BSC/RNC can try to handover the mobile terminal to its home network even when no other handover triggers are fulfilled. It should be noted that it is preferred that the neighbor lists are provided to the mobile station of the greenfield operator when the mobile station is operated in the active, or connected mode. However, it is also possible to provide the neighbor lists to the mobile station when it is operated in the idle mode.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of inter-operator handover in a mobile telecommunications network comprising a first operator of a first sub-network operated in a wideband code division multiplex access (WCDMA) mode having a plurality of first radio coverage areas, and a second operator of both a second sub-network and a third sub-network, wherein the second sub-network is operated in a radio frequency in accordance with the Global System for Mobile Communications (GSM) mode having a plurality of second radio coverage areas partly overlapping with the first radio coverage areas, and the third sub-network is operated in the WCDMA mode having a plurality of third radio coverage areas, and wherein the handover is performed for a mobile terminal of the first operator between the first and second operators when the mobile terminal is located in an overlapped section of the first coverage areas and the second coverage areas, said method comprising the steps of:

providing a first list of first radio coverage areas visible to the mobile terminal for allowing the mobile terminal to access the first radio coverage areas through the first sub-network when the mobile terminal moves into the first coverage areas; and providing a second list of second radio coverage areas to the mobile terminal, wherein the second list includes only one or more of each of the second radio coverage areas among the second radio coverage areas of the second sub-network and the third radio coverage areas of the third sub-networks of the second operator, so as to allow for the mobile terminal to access the second radio coverage areas of the second operator through the second sub-network while preventing the mobile terminal from accessing the third radio coverage areas of the second operator when the mobile terminal is located in the second coverage areas beyond the first coverage areas.

2. The method of claim 1, wherein the second list is provided when the mobile terminal is operated in a connected mode.

3. The method of claim 1, wherein the second list is provided when the mobile terminal is operated in an idle mode.

4. The method of claim 1, wherein the first list is provided by a radio network controller (RNC) of the first sub-network.

5. The method of claim 1, wherein the first list is provided by a base station controller (BSC) of the second sub-network.

6. The method of claim 1, wherein the second list is provided by a radio network controller (RNC) of the first sub-network.

7. The method of claim 1, wherein the second list is provided by a base station controller (BSC) of the second sub-network.

8. The method of claim 1, wherein the first operator has a plurality of further mobile terminals, and wherein the first list is specific to the mobile terminal of the first operator such that the first list is inaccessible to the further mobile terminals.

9. The method of claim 1, wherein the second operator has a plurality of further mobile terminals, and wherein the first list is specific to the mobile terminal of the first operator such that the first list is inaccessible to the further mobile terminals.

10. A system for inter-operator handover in a mobile telecommunications network comprising a first operator of a first sub-network operated in a wideband code division multiplex access (WCDMA) mode having a plurality of first radio coverage areas, and a second operator of both a second sub-network and a third sub-network, wherein the second sub-network is operated in a radio frequency in accordance with the Global System for Mobile Communications (GSM) mode having a plurality of second radio coverage areas partly overlapping with the first radio coverage areas, and the third sub-network is operated in the WCDMA mode having a plurality of third radio coverage areas, and wherein the handover is performed for a mobile terminal of the first operator between the first and the second operators when the mobile terminal is located in an overlapped section of the first coverage areas and the second coverage areas, said system comprising:

a first means, for providing a first list of first radio coverage areas visible to the mobile terminal for allowing the mobile terminal to access the first radio coverage areas through the first sub-network when the mobile terminal moves into the first coverage areas; and a second means, for providing a second list of second radio coverage areas to the mobile terminal, wherein the second list includes only one or more of each of the second radio coverage areas among the second radio coverage areas of the second sub-network and the third radio coverage areas of the third sub-networks of the second operator, so as to allow the mobile terminal to access the second radio coverage areas of the second operator through the second sub-network while preventing the mobile terminal from accessing the third radio coverage areas of the second operator when the mobile terminal is located in the second coverage areas beyond the first coverage areas.

11. The system of claim 10, wherein the second list is provided when the mobile terminal is operated in a connected mode.

12. The system of claim 10, wherein the second list is provided when the mobile terminal is operated in an idle mode.

13. The system of claim 10, wherein the first means is located in a radio network controller (RNC) of the first sub-network.

14. The system of claim 10, wherein the first list is provided by a base station controller (BSC) of the second sub-network.

15. The system of claim 10, wherein the second list is provided by a radio network controller (RNC) of the first sub-network.

16. The system of claim 10, wherein the second list is provided by a base station controller (BSC) of the second sub-network.

17. The system of claim 10, wherein the first operator has a plurality of further mobile terminals, and wherein the first list is specific to the mobile terminal of the first operator such that the first list is inaccessible to the further mobile terminals.

18. The system of claim 10, wherein the second operator has a plurality of further mobile terminals, and wherein the first list is specific to the mobile terminal of the first operator such that the first list is inaccessible to the further mobile terminals.

* * * * *

UNITED STATES PATENT AND TRADEMARK OFFICE
CERTIFICATE OF CORRECTION

PATENT NO. : 6,836,471 B2  Page 1 of 1
DATED : December 28, 2004
INVENTOR(S) : Holma et al.

It is certified that error appears in the above-identified patent and that said Letters Patent is hereby corrected as shown below:

<u>Column 7,</u>
Line 24, "for" should be -- for allowing --.
Line 34, "for" should be deleted.

Signed and Sealed this

Twenty-fourth Day of May, 2005

JON W. DUDAS
*Director of the United States Patent and Trademark Office*